April 21, 1942. W. H. KITTO Re. 22,077

SUCTION CLEANER

Original Filed Feb. 18, 1937 2 Sheets-Sheet 1

INVENTOR

William H. Kitto

BY

Harry S. Dunarse

ATTORNEY

April 21, 1942. W. H. KITTO Re. 22,077

SUCTION CLEANER

Original Filed Feb. 18, 1937 2 Sheets-Sheet 2

INVENTOR
William H. Kitto

BY
Harry S. Duncan
ATTORNEY

UNITED STATES PATENT OFFICE 22,077

SUCTION CLEANER

William H. Kitto, Canton, Ohio, assignor to The Hoover Company, North Canton, Ohio, a corporation of Ohio Original No. 2,159,701, dated May 23, 1939, Serial No. 126,392, February 18, 1937. Application for reissue December 21, 1940, Serial No. 372,161

10 Claims. (Cl. 15—16)

This invention relates to improvements in suction cleaners and more particularly to a type of cleaner in which a novel arrangement is provided for conducting a current of cooling air through the motor and thence discharging it into the atmosphere through a passage formed as a part of a dome-like cover or hood enclosing the motor.

The object of the invention is to provide a novel and improved solution of the problem of cooling the motor of a suction cleaner characterized by a somewhat larger hood over the motor than is usually provided and one that is extended lengthwise of the cleaner body a distance forwardly and rearwardly of the motor, thus giving the cleaner a so-called stream-lined appearance.

It may be added in this connection that the scheme of ventilating a motor is notoriously old and motors designed for suction cleaners have long been made with a small fan mounted on the armature shaft for promoting the flow of air through the motor and as a means of dissipating the heat generated by the motor. However, in a cleaner of the design heretofore alluded to, the problem of conducting air to and from the motor is somewhat complicated by the hood design and hence the following description has to do with the solution of this problem in a simple and practical manner.

In the accompanying drawings two arrangements for conducting the air from the motor to the atmosphere have been illustrated and will be described in the following discussion.

Thus, the figures of the drawings may be briefly described as follows.

Figure 1:
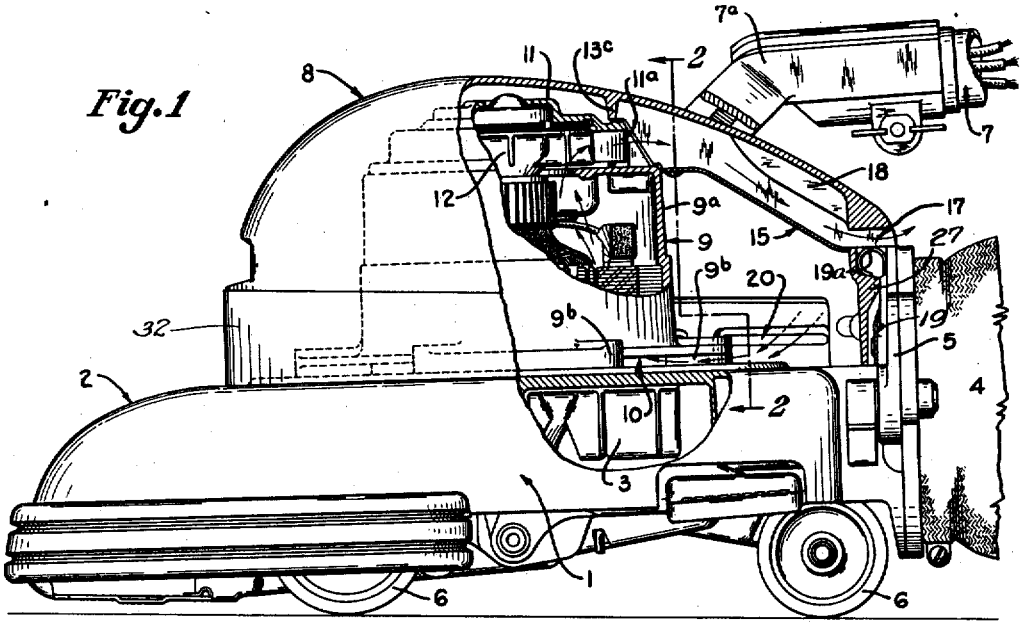
Figure 1 is a general view in side elevation of a suction cleaner embodying the novel features of the invention with portions broken away to show the internal construction.

Referring to the suction cleaner in its general aspects, the same consists of a somewhat shallow body portion or main casing 1 having a flat top surface and a rounded forward portion identifying the nozzle portion 2 extending across the forward end thereof. The nozzle portion is provided with a downwardly facing suction mouth leading rearwardly through a passage into a fan chamber in which a suction-creating fan 3 is located. The fan chamber opens rearwardly into an exhaust passage which in turn discharges into a dirt bag 4 having detachable connection with a flange 5 at the extreme rear end of the exhaust passage. The cleaner is supported on wheels 6 and is maneuvered over the surface by means of a handle 7 having a U-shaped bail 7a straddling the dome-shaped hood 8 over the motor 9.

The motor hood consists of an elongated dome-shaped cover primarily intended to serve as an enclosure for the motor 9 which is supported firmly on the main casing with its armature shaft vertical and in direct driving connection with the fan 3.

The motor 9 may be of any standard type suitable for the purpose, although as herein disclosed, it includes an outer shell or frame 9a of cylindric shape forming a substantially complete enclosure for the armature and stator. This cylindric shell or frame is preferably molded of a suitable plastic substance such as Bakelite and otherwise is designed and constructed as to preclude the necessity of an additional enclosure for the motor, except for the external appearance of the cleaner. The dome-like hood 8 is likewise molded of Bakelite and designed to give the stream-lined appearance heretofore mentioned, namely, the rounded and almost spherical front end portion gradually converging rearwardly to a comparatively square rear end but maintaining the rounded contour transversely throughout its length as clearly shown in Figures 2 and 3.

Figure 2:
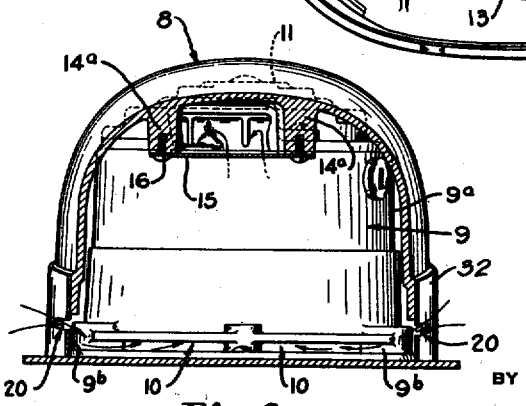
Figure 2 is a view in vertical section through the motor and hood as taken on line 2—2 of Figure 1.

Referring further to the motor 9, and particularly its mounting upon the top wall of the main casing 1, the shell or frame 9a is provided about its bottom edge with suitable supporting feet 9b resting upon the top wall of the casing and spaced apart so as to form slots 10 therebetween as clearly shown in Figure 2. These slots open into the lower end of the motor frame allowing air from the surrounding space to pass upwardly through and around the armature and finally to a cap-like member 11 over the upper end of the motor frame 9a and providing a chamber for a small motor ventilating fan 12 mounted at the upper end of the armature shaft. And finally, the motor ventilating fan chamber 11 has a laterally facing slot or opening 11a arranged in a plane slightly oblique to the vertical and adapted to communicate with a passage extending rearwardly along the top wall of the motor hood 8 and then to the atmosphere through a horizontal slot formed in the rear wall of the hood immediately above the dirt bag supporting connection at the rear end of the main passage 1.

Figure 3:
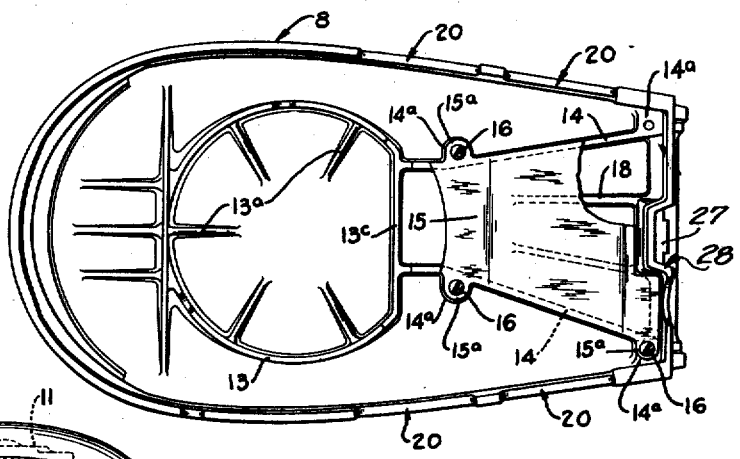
Figure 3 is a plan view of the inside of the motor hood removed from the cleaner body.

But before describing the exhaust passage in the motor hood 8, attention will first be directed to Figure 3 showing somewhat the complicated and intricate arrangement of integral webs depending from the inner surface of the top wall of the motor hood 8. Thus at the center is a substantially circular web 13 with inwardly projecting radial segments 13a. This annular web 13 seats on the motor with its edges bearing against the top surface of the motor frame 9a. Now, the rearmost portion of the annular web 13 has the form of a straight chord-like segment 13c and extending rearwardly therefrom with a distinct outward taper or flare is a pair of depending webs or flanges 14, 14 terminating at the opposite rear corners of the hood but arranged slightly unsymmetrically with respect to its longitudinal center line as is clearly seen in Figure 3. These depending webs 14, 14 form the side walls of the exhaust passage for the ventilating air discharged from the fan chamber 11 at the upper end of the motor frame. Incidentally, this passage is offset from the center line of the hood because the discharge outlet 11a from the ventilating fan chamber 7 is likewise offset to conform with the tangential direction of the air as it leaves the fan blades.

Now, to complete the ventilating exhaust passage, a light metal plate 15 is fitted over the bottom edges of the depending webs 14, 14, this plate being shaped to conform to the outline of the space included between said webs 14, 14 and having at its forward and rear corners enlarged ear-like portions 15a registering with pairs of bosses 14a and forming an anchorage for a set of retaining screws 16 for the bottom plate 15.

As clearly shown in Figure 1, the bottom plate 15 forming the exhaust passage assumes an inclined position generally parallel with the downwardly sloping top wall of the motor hood 8, but at its front and rear edges it is bent to abut the motor and the rear wall of the hood at right angles respectively, the front edge of the plate coinciding with the lower edge of the outlet 11a and its rear edge with the bottom of a narrow transverse slot 17, extending substantially the full width of the vertical rear wall of the hood and forming the outlet for the air passage. Immediately above the entrance to the outlet slot 17 is a pair of integral reinforcing webs 18, 18 for structural purposes only, and immediately below the slot 17 is a spring latching member 19 carried by the exhaust outlet flange 6 and which serves to hold the hood in place upon the main casing, as will later be described in detail.

And finally to complete the circulatory system for the motor ventilating air, there is provided along the lower edges of the motor hood 8, a pair of elongated inlet slots 20, 20 located on opposite sides of the motor hood and near the rear end thereof. Thus, referring to Figures 1 and 2, it will be observed by following the arrows indicating the direction of the ventilating air, that the air is first drawn into the hood 8 through the slots 20 along the lower edges thereof, thence into the slots 10 around the base of the motor casing, upwardly through the motor and into the ventilating fan chamber 11, and finally rearwardly and downwardly through the exhaust passage, and finally discharged into the atmosphere through the rearwardly opening slot 17.

Figure 4:
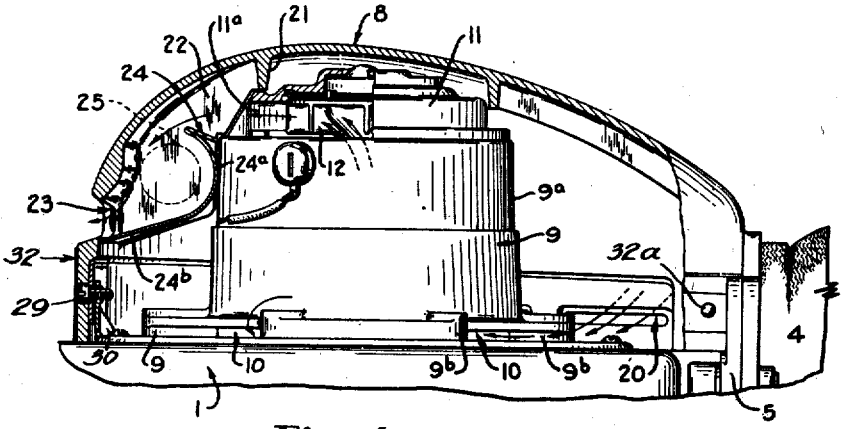
Figure 4 is a view of the motor casing and hood in vertical section and showing a modified arrangement for discharging the air from the motor.
Figure 5:
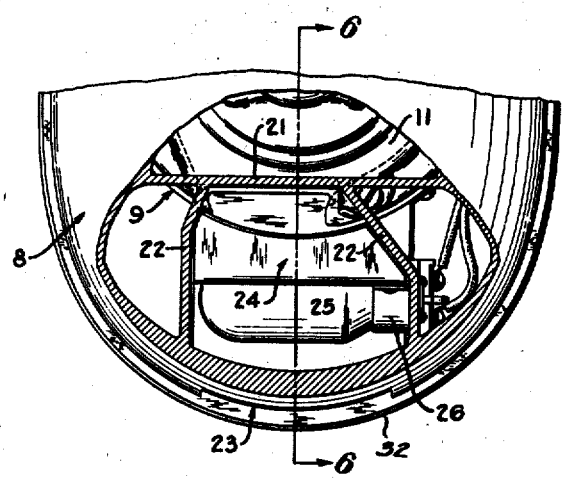
Figure 5 is a fragmentary top plan view of the forward end of the motor hood with a portion of its top wall broken away to show the arrangement of the parts therebelow.
Figure 6:
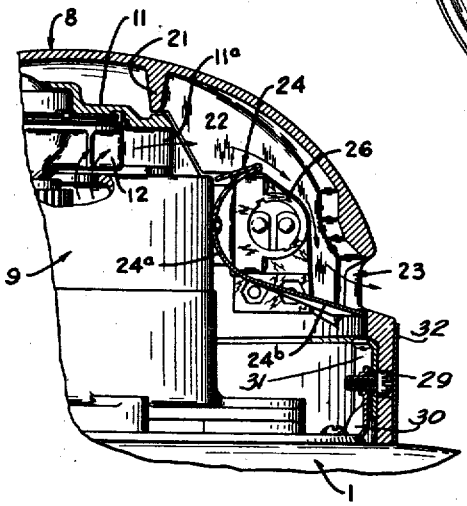
Figure 6 is a detailed view in vertical section through the forward end of the hood as taken on line 6—6 of Figure 5.

Referring now to Figures 4, 5 and 6, an alternate method of discharging the motor ventilating air is disclosed wherein advantage is taken of an opening already available at the forward end of the motor hood for the discharge outlet. This opening is the window through which light is thrown from a lamp to illuminate the floor or carpet surface immediately in front of the cleaner. In short, the air outlet from the upper end of the motor casing is directed forwardly instead of rearwardly and into the same chamber which houses the lamp and from whence it passes outwardly through the window.

For this alternative arrangement, the motor 9 would be identical in every respect, except that ventilating air chamber 11 at the top of the motor frame faces forwardly instead of rearwardly. In other words, it can be assumed that either the same motor has been turned through an angle of 180 degrees, or that the upper end portion of the motor frame 9a can be turned or rotated through 180 degrees from the rear to the front.

As for the motor hood, its general shape and construction would be the same as before except that there would be made no provision for the mounting of a separate plate for the formation of a discharge passage, nor would there be an outlet slot formed in the rear wall of the hood. There would, however, be internal reinforcing webs extending rearwardly from the center of the hood, but these would be merely for structural purposes.

Referring now to the internal construction of the hood throughout its forward end (and which would be practically the same regardless of the particular method of discharging the motor ventilating air therefrom), there is formed immediately above the forward portion of the motor, a transverse extending integral web 21 having bearing contact with the forward portion of the motor casing 9a just above the discharge outlet from the motor ventilating fan chamber 11. Now, extending forwardly and transversely from the web 21 is a pair of wall segments 22, 22 which are spaced apart on opposite sides of the longitudinal center line of the hood to form the side walls of the lamp chamber in the forward end of the hood. As clearly shown in Figure 5, these wall segments 22, 22 merge with the transverse web 21 at points offset at different distances from the center line of the hood and for this reason are inclined outwardly at different angles throughout their inner end portions but finally become parallel with each other as they approach the rounded front wall of the hood with which they are integrally molded.

A transversely elongated window opening 23 is located at a point substantially one-half of the height of the hood and extends practically the full width of the lamp chamber. A metal reflector 24 is mounted at the front of the motor being suitably attached thereto and consisting of a substantially semi-circular portion 24a facing forwardly somewhat above the level of the window 23 and an extension 24b of the semicircular portion forming an inclined bottom wall of the lamp chamber abutting the front wall of the hood immediately below the window 23. Extending transversely of the lamp chamber is a lamp 25, supported in a suitable socket 26 mounted along one edge of the reflector 24 and having suitable electrical connection with the source of current for the motor. The lamp 25 is properly positioned with reference to the reflector 24 to throw the light outwardly through the window opening 23 and in a downwardly direction to cover a small area immediately in front of the cleaner.

Thus without elaborating further as to the construction of the lamp chamber and the arrangement of the lamp therein, it is sufficient to observe that the motor ventilating air having passed upwardly through the motor in the manner already described, is discharged forwardly into the upper end portion of the lamp chamber, whereupon it follows a downward path, thence finding its way out of the hood through the window 23.

Inasmuch as cleaners of the type herein disclosed are invariably equipped with illuminating head lights at the forward end of the motor hood, the utilization of the lamp chamber and the window affords a natural outlet for the motor ventilating air and thus obviates the necessity for providing a passage in the hood as in the first arrangement described. At the same time, each arrangement has its advantages. Thus, the formation of a separate discharge passage leading outwardly through the rear end of the hood may increase slightly the cost of production, it has the advantage of providing an unobstructed passage for the air and one in which dirt will not accumulate readily. On the other hand, the utilization of the lamp chamber affords a somewhat less expensive construction in which the undesirable heat given off by the lamp in operation is removed, but it also has a disadvantage, namely, that dirt particles would tend to be deposited on the lamp and reflecting surfaces and otherwise to accumulate within the lamp chamber.

In any case, it is quite evident that regardless of the particular point from which the motor ventilating air is discharged from the hood, the exhaust passage is formed as a part of the hood and so arranged that in its assembly upon the motor casing, the connection between the exhaust passage and the outlet from the motor casing is established.

To complete the mounting of the hood 8 upon the casing 1, mention was made of the spring latch member 19 mounted at the rear of the casing. This latch member is preferably a short strip of spring steel fastened at its lower end to the front face of the upstanding flange 5 at the exhaust outlet connection, midway between its side edges. The upper end of the latch member is bent to form a loop 19a located just below the top edge of the flange 5 and registering therewith is a detent 27 formed in the outer face of the rear wall of the hood 8 and more particularly, within a shallow U-shaped recess 28 extend vertically and centrally of said rear wall, as shown in Figure 3. This detent presents an upwardly facing shoulder adapted to have yielding contact with the underside of the looped end 19a of the latch member 19, so that by first seating the rear end of the hood against the rear flange 5 with the detent 27 beneath the latch member, the front end is then lowered onto the top of the casing and secured by means of a screw 29 which is inserted through a hole in the front lower edge of the hood and registering with a threaded hole in an upstanding bracket 30 mounted on the top face of the casing 1 just inwardly from the edge of the hood, as shown in Figure 4. The inner face of the hood immediately adjacent the screw fastening is preferably lined with a thin plate 31.

And to complete the mounting of the hood, a metallic band 32 fits around the bottom edge of the hood, being riveted at its rear ends at 32a just forwardly of the exhaust outlet as shown in Figure 4. This band is not removable but is free to slide upwardly at the front of the hood, so that the screw 29 is accessible for removing the hood. And finally, the bend 32 is slotted to register with the inlet openings 20.

This method of mounting the hood is comparatively simple and yet is firm, vibrationless, and readily removable.

Having set forth a complete disclosure of my invention, I now claim:

1. In a suction cleaner, the combination with a main casing including suction-creating means, of a motor supported upon said casing and operatively connected with said suction-creating means, said motor being provided with ventilating means including air inlet and outlet openings at opposite ends thereof, and a hood enclosing said motor provided with a passageway formed by integral wall segments and having an opening at one end adapted to register with the outlet opening of said motor and communicating at its other end with an opening through said hood.

2. In a suction cleaner, the combination with a main casing including suction-creating means, of a motor supported upon said casing and having operative connection with said suction-creating means, said motor having a frame provided with air inlet and outlet openings adjacent opposite ends thereof and means for creating a flow of air through said motor for ventilating purposes, a hood enclosing said motor and having a discharge passageway for the motor ventilating air and comprising wall segments integral with the inner wall surface of the hood and adapted to connect the outlet opening from said motor with a discharge opening in said hood.

3. In a suction cleaner, the combination of a casing including suction-creating means, an electric motor mounted upon said casing and having driving connection with said suction-creating means, said motor having a substantially imperforate frame provided with an air inlet and outlet openings at its opposite ends and means for creating a current of air therethrough, and a hood enclosing said motor and a substantial space surrounding the same and having a motor ventilating air discharge passage formed by wall segments enclosing a space along the internal surface of said hood and connecting the outlet opening of said motor frame with an opening in said hood.

4. In a suction cleaner, the combination with a casing including suction-creating means, an electric motor supported upon said casing and having driving connection with said suction-creating means, said motor having a substantially enclosed frame with an air inlet and outlet opening at its base and top respectively, and a hood enclosing said motor and a substantial space about the same, said hood having openings communicating with the space enclosed thereby and an air passage extending along the inner surface thereof and formed by integral spaced parallel wall segments and a transverse wall segment, said passage connecting the outlet opening from said motor frame with an outlet opening in the wall of said hood.

5. In a suction cleaner, the combination of a main casing including suction-creating means, a motor supported upon said casing and having a direct driving connection with said suction-creating means, a hood supported upon said casing and enclosing said motor, said motor being adapted to have a current of air impelled axially thereof and to be discharged through an opening at its top, said hood being provided with an air outlet opening in its side wall and a passage connecting said air outlet opening with the discharge opening from said motor, and consisting of a pair of spaced webs integral with the inner surface of said hood and a bottom wall segment extending transversely between said webs.

6. In a suction cleaner, the combination of a main casing including suction-creating means and provided with a flat top surface, a motor supported upon said casing and having driving connection with said suction-creating means, said motor having a substantially closed frame adapted to have a current of air impelled vertically therethrough and to be discharged through a laterally facing opening directed toward one end of said hood, the latter being provided with air inlet openings adjacent its base, an air outlet opening in one end wall thereof and a motor ventilating air discharge passage adapted to connect said air outlet opening and the discharge opening at the upper end of said motor frame and comprising a pair of spaced webs integral with the inner surface of said hood and a metal plate forming the bottom wall thereof.

7. In a suction cleaner, the combination of a casing having a nozzle, motor-driven suction-creating means including a motor supported upon said casing and comprising a frame having an inlet opening at its base and an outlet opening adjacent its top for the circulation of ventilating air therethrough, air-moving means to draw air through said casing, a hood enclosing said motor and forming a chamber at its forward end adjacent said nozzle adapted to house a lamp, a lamp positioned in said chamber, said chamber being connected with the outlet opening from said motor frame and having an opening at its bottom for the discharge of the air to the atmosphere and for light rays from said lamp.

8. In a suction cleaner, the combination of a casing having a nozzle, motor-driven suction-creating means including a motor supported upon said casing and comprising a frame having openings at its opposite ends for the circulation of ventilating air therethrough, a hood enclosing said motor and forming a closed chamber at one of said openings rearwardly of and above said nozzle, a lamp in said chamber, said chamber being formed with an exterior opening facing forwardly and toward said nozzle to permit the passage of ventilating air and light rays therethrough, and a ventilating fan to draw a stream of air through said frame and chamber to cool said motor and said light.

9. In a suction cleaner, the combination of a casing having a nozzle, motor-driven suction-creating means including a motor supported upon said casing and formed with a ventilating air inlet opening and an outlet opening, a lamp mounted relative to said nozzle as to throw light rays forwardly thereof and being positioned adjacent one of said openings in said motor, and air-moving means to move air through said inlet and exhaust it through said outlet, said air in its movement passing over said lamp in its position adjacent one of said openings to remove the heat generated in the operation thereof.

10. In a suction cleaner, the combination of a casing having a nozzle, motor-driven suction-creating means including a motor supported upon said casing and formed with a ventilating air inlet at one end and an outlet at the other end, a lamp mounted relative to said nozzle as to throw light rays forwardly thereof and positioned adjacent one of said openings and said motor, and air-moving means positioned in said frame to move air through said inlet and exhaust it through said outlet and over said lamp in the sequence stated to remove the heat generated in the operation thereof.

WILLIAM H. KITTO.

Disclaimer

Re. 22,077.—*William H. Kitto*, Canton, Ohio. SUCTION CLEANER. Patent dated Apr. 21, 1942. Disclaimer filed May 11, 1948, by the assignee, *The Hoover Company*.

Hereby enters this disclaimer to claims 7, 8, 9, and 10 of said patent.

[*Official Gazette June 8, 1948.*]